(12) United States Patent
Prandi et al.

(10) Patent No.: US 8,539,834 B2
(45) Date of Patent: Sep. 24, 2013

(54) MICROELECTROMECHANICAL GYROSCOPE WITH CALIBRATED SYNCHRONIZATION OF ACTUATION AND METHOD FOR ACTUATING A MICROELECTROMECHANICAL GYROSCOPE

(75) Inventors: Luciano Prandi, Bellinzago Novarese (IT); Carlo Caminada, Rho (IT); Alessandra Maria Rizzo Piazza Roncoroni, Abiategrasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 287 days.

(21) Appl. No.: 13/026,941

(22) Filed: Feb. 14, 2011

(65) Prior Publication Data

US 2011/0197674 A1    Aug. 18, 2011

(30) Foreign Application Priority Data

Feb. 15, 2010    (IT) ................................ TO2010A0106

(51) Int. Cl.
*G01C 19/56* (2012.01)
(52) U.S. Cl.
USPC ..................................... 73/504.12; 73/504.14
(58) Field of Classification Search
USPC .............................. 73/504.12, 504.04, 504.14
See application file for complete search history.

(56) References Cited

U.S. PATENT DOCUMENTS

| | | | |
|---|---|---|---|
| 6,911,928 B2 | 6/2005 | Orsier et al. | ................... 341/143 |
| 7,305,880 B2 | 12/2007 | Caminada et al. | |
| 7,322,237 B2 * | 1/2008 | Kutsuna | ..................... 73/504.12 |
| 7,616,078 B2 * | 11/2009 | Prandi et al. | ................... 333/186 |
| 7,779,687 B2 * | 8/2010 | Murashima | ................ 73/504.12 |
| 7,827,864 B2 * | 11/2010 | Prandi et al. | ............... 73/504.18 |
| 8,051,698 B2 * | 11/2011 | Prandi et al. | ................... 73/1.77 |
| 8,113,051 B2 * | 2/2012 | Matsumoto et al. | ........ 73/504.12 |
| 2008/0111585 A1 | 5/2008 | Fukuzawa | |
| 2010/0307243 A1 | 12/2010 | Prandi et al. | ............... 73/504.12 |
| 2011/0146402 A1 * | 6/2011 | Donadel et al. | ............ 73/504.12 |
| 2011/0197675 A1 * | 8/2011 | Caminada et al. | ......... 73/504.12 |

* cited by examiner

*Primary Examiner* — Helen Kwok
(74) *Attorney, Agent, or Firm* — Seed IP Law Group PLLC

(57) ABSTRACT

A gyroscope includes a body, a driving mass, which is mobile according to a driving axis, and a sensing mass, which is driven by the driving mass and is mobile according to a sensing axis, in response to rotations of the body. A driving device forms a microelectromechanical control loop with the body and the driving mass and maintains the driving mass in oscillation with a driving frequency. The driving device comprises a frequency detector, which supplies a clock signal at the frequency of oscillation of the driving mass, and a synchronization stage, which applies a calibrated phase shift to the clock signal so as to compensate a phase shift caused by components of the loop that are set between the driving mass and the control node.

17 Claims, 5 Drawing Sheets

MICROELECTROMECHANICAL GYROSCOPE WITH CALIBRATED SYNCHRONIZATION OF ACTUATION AND METHOD FOR ACTUATING A MICROELECTROMECHANICAL GYROSCOPE

BACKGROUND

1. Technical Field

The present disclosure relates to a microelectromechanical gyroscope with calibrated synchronization of actuation and to a method for actuating a microelectromechanical gyroscope.

2. Description of the Related Art

As is known, the use of microelectromechanical systems (MEMS) has become progressively widespread in various sectors of technology and has yielded encouraging results especially for providing inertial sensors, microintegrated gyroscopes, and electromechanical oscillators for a wide range of applications.

MEMS of this type are usually based on microelectromechanical structures comprising at least one movable mass connected to a fixed body (stator) by springs and movable with respect to the stator according to pre-determined degrees of freedom. The movable mass is moreover coupled to the fixed body via capacitive structures (capacitors). The movement of the movable mass with respect to the fixed body, for example on account of an external stress, modifies the capacitance of the capacitors; from this it is possible to trace back to the relative displacement of the movable mass with respect to the fixed body and hence to the force applied. Vice versa, by supplying appropriate biasing voltages, it is possible to apply an electrostatic force to the movable mass to set it in motion. In addition, to provide electromechanical oscillators, the frequency response of inertial MEMS structures is exploited, which is typically of the second-order low-pass type.

Many MEMS (in particular, all electromechanical oscillators and gyroscopes) include driving devices that have the task of maintaining the movable mass in oscillation.

A first type of known solution envisages supplying, in open loop, periodic excitation at the resonance frequency of the MEMS structure. The solution is simple, but also far from effective, because the resonance frequency is not known with precision on account of the ineliminable dispersions in the processes of micromachining of semiconductors. In addition, the resonance frequency of each individual device can vary over time, for example, on account of temperature gradients or, more simply, on account of ageing.

Feedback driving circuits have then been proposed, based upon the use of sigma-delta modulators. Circuits of this type are undoubtedly more effective than the previous ones in stabilizing the oscillation of the movable mass at the real resonance frequency and in suppressing disturbance.

However, various stages are employed for filtering, decimation, and further processing of the bitstream supplied by the sigma-delta modulator. For this reason, currently available feedback driving circuits are complex to produce, cumbersome and, in practice, costly.

In addition, it should be considered that gyroscopes have a complex electromechanical structure, which comprises two masses that are movable with respect to the stator and are coupled to one another so as to present a relative degree of freedom. The two movable masses are both capacitively coupled to the stator. One of the movable masses is dedicated to driving (driving mass) and is kept in oscillation at the resonance frequency. The other movable mass (sensing mass) is driven in the oscillatory motion and, in the case of rotation of the microstructure with respect to a pre-determined axis with an angular velocity, is subject to a Coriolis force proportional to the angular velocity itself. In practice, the sensing mass operates as an accelerometer that enables sensing of the Coriolis acceleration.

For enabling actuation and providing an electromechanical oscillator in which the sensor performs the role of frequency-selective amplifier, with transfer function of a second-order low-pass type and high merit factor, the driving mass is equipped with two types of differential capacitive structures: driving electrodes and driving-detection electrodes. The driving electrodes have the purpose of sustaining self-oscillation of the movable mass in the direction of actuation, through electrostatic forces generated by the spectral component of the noise at the mechanical resonance frequency of the driving mass.

The driving-detection electrodes have the purpose of measuring, through the transduced charge, the position of translation or rotation of the sensing mass in the direction of actuation.

The U.S. Pat. No. 7,305,880 describes a system for controlling the velocity of oscillation of the gyroscope, comprising a differential sense amplifier, a high-pass amplifier, and an actuation and control stage, operating in a continuous-time mode.

The U.S. Pat. No. 7,827,864 describes an improvement of the foregoing control system, in which the control loop comprises a low-pass filter in order to reduce the offset and the effects of parasitic components and couplings by operating on the overall gain and phase of the feedback loop.

These systems, albeit operating frequently in a satisfactory way, may, however, undergo improvement as regards area occupation. These systems synchronize the read and control circuits precisely in order to preserve the advantages deriving from the use of microstructures with driving and sensing masses not electrically insulated from one another (in particular on account of the technological difficulties in providing the insulation, which render the manufacturing processes considerably more complex and costly). For this purpose, phase-locked-loop (PLL) circuits are normally used, which have, however, a far from negligible impact in terms of area occupation, as well as of consumption levels, and include external filtering components. In addition, at the start and upon waking-up from low-consumption (the so-called "power-down") configurations or from conditions of loss of synchronism, the PLL circuits may have transients even of several hundreds of milliseconds before completing phase locking. The consequent delay in the response can be very detrimental in certain applications.

BRIEF SUMMARY

Some embodiments of the present disclosure provide a microelectromechanical gyroscope and a method for actuating a microelectromechanical gyroscope that will make it possible to overcome the limitations described.

According to the present disclosure, a microelectromechanical gyroscope and a method for actuating a microelectromechanical gyroscope are provided.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
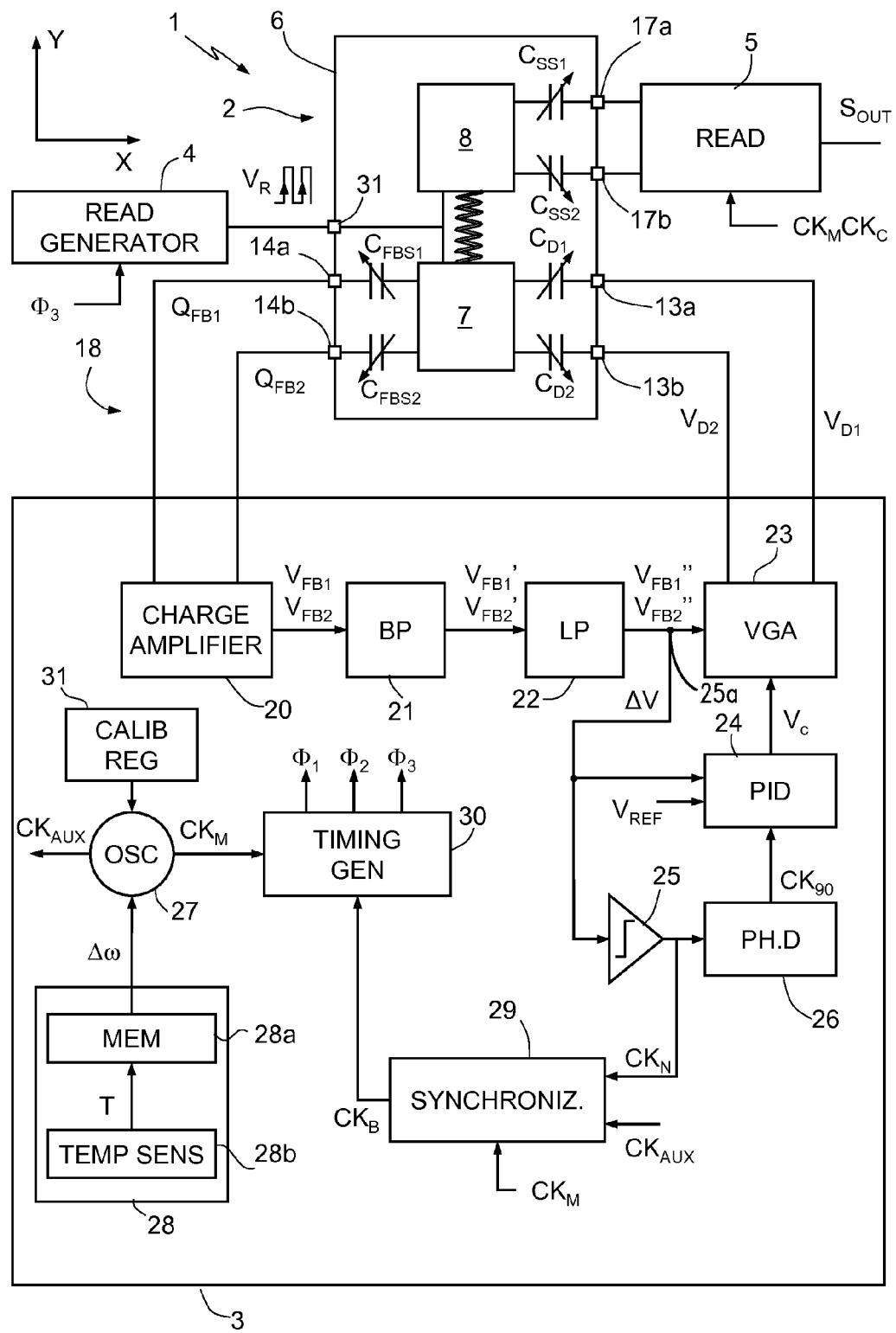
FIG. 1 is a simplified block diagram of a microelectromechanical gyroscope according to one embodiment of the present disclosure.

FIG. 1 shows as a whole a microelectromechanical gyroscope 1, which comprises a microstructure 2, made of semiconductor material, a driving device 3, a read generator 4, and a read device 5.

The microstructure 2 is made of semiconductor material and comprises a body 6, a driving mass 7, and at least one sensing mass 8. For simplicity, in the embodiment illustrated herein reference will be made to the case of a uniaxial gyroscope, in which a single sensing mass 8 is present. What is described hereinafter applies, however, also to the case of multiaxial gyroscopes, which comprise two or more sensing masses or systems of sensing masses, for detecting rotations according to respective independent axes.

The driving mass 7 is elastically constrained to the fixed structure 6 so as to be able to oscillate about a resting position according to a translational or rotational degree of freedom. The sensing mass 8 is mechanically coupled to the driving mass 7 so as to be driven in motion according to the degree of freedom of the driving mass 7 itself. In addition, the sensing mass 8 is elastically constrained to the driving mass 7 so as to oscillate in turn with respect to the driving mass 7 itself, with a respective further degree of freedom, in response to rotational movement of the body 6.

In the embodiment described herein, in particular, the driving mass 7 is linearly movable along a driving axis X, while the sensing mass 8 is movable with respect to the driving mass 7 according to a sensing axis Y, that is perpendicular to the driving axis X.

It is understood, however, that the type of movement (whether translational or rotational) allowed by the degrees of freedom and the arrangement of the driving and sensing axes may vary according to the type of gyroscope. With reference to the movements of the driving mass 7 and of the sensing mass 8, moreover, the expression "according to an axis" will be indifferently used in relation to movements along an axis or about an axis, according to whether movements allowed to the masses by the respective degrees of freedom are translational (along an axis) or else rotational (about an axis). Likewise, the expression "according to a degree of freedom" will be indifferently used in relation to translational or rotational movements, as allowed by the degree of freedom itself.

In addition, the driving mass 7 (with the sensing mass 8) is connected to the body 6 so as to define a resonant mechanical system with a resonance frequency OR (according to the driving axis X).

Figure 2:
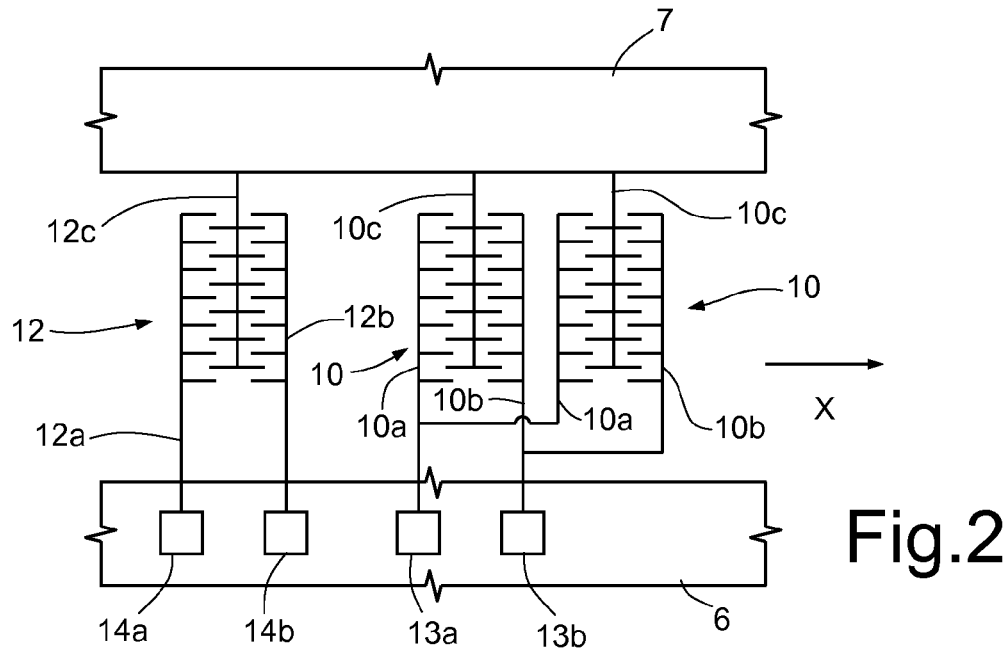
FIG. 2 is a top plan view of an enlarged detail of the gyroscope of FIG. 1.

The driving mass 7 (FIG. 2) is capacitively coupled to the body 6 through driving units 10 and feedback-sensing units 12. The capacitive coupling is of a differential type.

In greater detail, the actuation units 10 comprise first and second fixed driving electrodes 10a, 10b, which are anchored to the body 6 and extend substantially perpendicular to the driving direction X, and movable driving electrodes 10c, which are anchored to the driving mass 7 and are also substantially perpendicular to the driving direction X. The movable driving electrodes 10c are comb-fingered and capacitively coupled with respective first fixed driving electrodes 10a and second fixed driving electrodes 10b. In addition, the first and second fixed driving electrodes 10a, 10b of the actuation units 10 are electrically connected to a first driving terminal 13a and to a second driving terminal 13b, respectively, of the microstructure 2. Furthermore, as has been mentioned, the coupling is of a differential type. In other words, in each actuation unit 10a movement of the driving mass 7 along the driving axis X causes the capacitance between the movable driving electrode 10c and one of the fixed driving electrodes 10a, 10b to increase. The capacitance between the movable driving electrode 10c and the other of the fixed driving electrodes 10a, 10b decreases instead accordingly.

The structure of the feedback-sensing units 12 is similar to that of the actuation units 10. In particular, the feedback-sensing units 12 comprise first and second fixed sensing electrodes 12a, 12b, anchored to the body 6, and movable sensing electrodes 12c, anchored to the driving mass 7 and comb-fingered and capacitively coupled with respective first fixed sensing electrodes 12a and second fixed sensing electrodes 12b. In addition, the first and second fixed sensing electrodes 12a, 12b of the feedback-sensing units 12 are electrically connected respectively to a first feedback-sensing terminal 14a and a second feedback-sensing terminal 14b of the microstructure 2.

Hence, in practice, the driving mass 7 is coupled to the driving terminals 13a, 13b through differential driving capacitances $C_{D1}$, $C_{D2}$ and to the sensing terminals 14a, 14b through feedback-sensing differential capacitances $C_{FBS1}$, $C_{FBS2}$.

Figure 3:
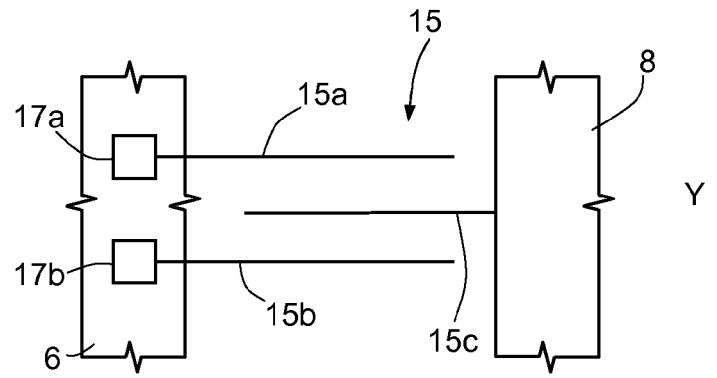
FIG. 3 is a top plan view of a further enlarged detail of the gyroscope of FIG. 1.

The sensing mass 8 is electrically connected to the driving mass 7, without interposition of insulating structures. Consequently, the sensing mass 8 and the driving mass 7 are at the same potential. The sensing mass 8 is moreover capacitively coupled to the body 6 through signal-sensing units 15 (FIG. 3). More precisely, the signal-sensing units 15 comprise third and fourth fixed sensing electrodes 15a, 15b, anchored to the body 6, and movable sensing electrodes 15c, anchored to the sensing mass 8 and arranged between respective third fixed sensing electrodes 15a and fourth fixed sensing electrodes 15b. Also in this case, the capacitive coupling is of a differential type, but it is obtained through parallel-plate electrodes, which are perpendicular to the sensing direction Y. In addition, the third and fourth fixed sensing electrodes 15a, 15b of the signal-sensing units 15 are electrically connected, respectively, to a first signal-sensing terminal 17a and to a second signal-sensing terminal 17b of the microstructure 2. In practice, the sensing mass 8 is coupled to the signal-sensing terminals 17a, 17b through signal-sensing differential capacitances $C_{SS1}$, $C_{SS2}$.

With reference again to FIG. 1, the driving device 3 is connected to the driving terminals 13a, 13b and to the feedback-sensing terminals 14a, 14b of the microstructure 2 so as to form, with the driving mass 7, an oscillating microelectromechanical loop 18, with control of position of the driving mass 7. In greater detail, the driving device 3 comprises a charge amplifier 20, a band-pass filter 21, a low-pass interpolator filter 22, a variable-gain amplifier 23, a controller 24, a comparator 25, and a digital phase-shifter module 26. In addition, an oscillator 27, a temperature-compensation module 28, a synchronization stage 29, and a timing generator 30 are used for supplying timing signals for the driving device 3, for the read generator 4, and for the read device 5.

The microelectromechanical loop 18 is of a hybrid type. The charge amplifier 20 is, in fact, of the switched-capacitor type and is configured for operating in discrete time, whereas the low-pass filter 22 and the variable-gain amplifier 23 operate in continuous time. The band-pass filter 21 carries out time-discrete-to-time-continuous conversion. In addition, the charge amplifier 20 defines a detection interface for detecting the position x of the driving mass 7 with respect to the driving axis X. The remaining components of the driving device 3 co-operate for controlling, on the basis of the position x of the driving mass 7, the amplitude of oscillation of the microelectromechanical loop 18, in particular the amplitude of oscillation of the driving mass 7, and maintain it close to a reference amplitude. The reference amplitude is, in particular, determined by a reference voltage $V_{REF}$, which is supplied to the controller 24.

The charge amplifier 20, which is of a fully differential type and has inputs respectively connected to the first and second feedback-sensing terminals 14a, 14b, defines a detection interface for detecting the position x of the driving mass 7 with respect to the driving axis X. The charge amplifier 20 receives differential feedback charge packets $Q_{FB1}$, $Q_{FB2}$ from the feedback-sensing terminals 14a, 14b of the microstructure 2 and converts them into feedback voltages $V_{FB1}$, $V_{FB2}$, indicative of the position x of the driving mass 7. In this way, the charge amplifier 20 carries out a discrete-time reading of the position x of the driving mass 7.

The band-pass filter 21 is cascaded to the charge amplifier 20 and introduces a phase shift that is as close as possible to 90° and in any case comprised in the interval 90°+40°. In one embodiment, the band-pass filter 21 comprises a sample-and-hold circuit and is moreover configured so as to carry out a first low-pass filtering. Phase-shifted feedback voltages $V_{FB1}'$, $V_{FB2}'$ supplied by the band-pass filter 21 are thus delayed and attenuated with respect to the feedback voltages $V_{FB1}$, $V_{FB2}$. The phase-shifted feedback voltages $V_{FB1}'$, $V_{FB2}'$ present basically step-like variations.

The low-pass filter 22 is arranged downstream of the band-pass filter 21, is a fully differential filter at least of the second order, and supplies filtered feedback voltages $V_{FB1}''$, $V_{FB2}''$ which are continuously variable in time. The cut-off frequency of the low-pass filter 22 is selected in such a way that the frequency of oscillation of the microelectromechanical loop 18 (in particular of the driving mass 7), hereinafter referred to as driving frequency $\omega_D$, is included in the passband and in such a way that the phase of the useful signal indicating the position x of the driving mass 7 is not substantially altered. In addition, the passband of the low-pass filter 22 is such that the undesirable signal components, linked to sampling by discrete-time reading, are attenuated by at least 20 dB.

In order to prevent offsets that could jeopardize control of the oscillations of the microelectromechanical loop 18, both the band-pass filter 21 and the low-pass filter 22 are based upon amplifiers provided with auto-zero function.

The variable-gain amplifier 23 is of a continuous-time fully differential type, is cascaded to the low-pass filter 22, and has outputs connected to the driving terminals 13a, 13b of the microstructure 2, for supplying driving voltages $V_{D1}$, $V_{D2}$ such as to sustain the oscillation of the microelectromechanical loop 18 at the driving frequency $\omega_D$, close to the mechanical resonance frequency $\omega_R$ of the microstructure 2. For this purpose, the gain G of the variable-gain amplifier 23 is determined by the controller 24 through a control signal $V_C$ correlated to the filtered feedback voltages $V_{FB1}''$, $V_{FB2}''$ supplied by the low-pass filter 22. The controller 24 is, for example, a discrete-time PID controller.

In particular, the gain G is determined so as to maintain the conditions of oscillation of the microelectromechanical loop 18 (unit loop gain with phase shift that is an integer multiple of 360°). For this purpose, the controller 24 receives at input the reference voltage $V_{REF}$, which indicates the desired reference amplitude of oscillation.

The comparator 25 has inputs connected to the inputs of the variable-gain amplifier 23, which define control nodes 25a, and receives the difference voltage $\Delta V$ between the filtered feedback voltages $V_{FB1}''$, $V_{FB2}''$ at output from the low-pass filter 22. The comparator 25 switches at each zero crossing of the difference voltage $\Delta V$, thus operating as frequency-detector device. In one embodiment, the comparator 25 is connected to a single control node and switches at each zero crossing of one of the filtered feedback voltages $V_{FB1}''$, $V_{FB2}''$ (the zero crossings of the filtered feedback voltages $V_{FB1}''$, $V_{FB2}''$ and of the difference voltage $\Delta V$ coincide).

The output of the comparator 25, which is connected to an input of the phase-shifter module 26, supplies a native clock signal $CK_N$ having the current frequency of oscillation of the microelectromechanical loop 18. The native clock signal $CK_N$ is, however, phase-shifted with respect to the driving mass, on account of the presence of the charge amplifier 20, of the band-pass filter 21, and of the low-pass filter 22.

The phase-shifter module 26 supplies a quadrature clock signal $CK_{90}$, which is phase-shifted by 90° with respect to the native clock signal $CK_N$ and is used for timing the controller 24. In practice, the quadrature clock signal $CK_{90}$ switches at the maxima and at the minima of the filtered feedback voltages $V_{FB1}''$, $V_{FB2}''$ at output from the low-pass filter 22. The controller 24 is thus properly timed so as to detect the peak values of the difference $\Delta V$ between the filtered feedback voltages $V_{FB1}''$, $V_{FB2}''$.

As has been mentioned, the oscillator 27, the temperature-compensation module 28, the synchronization stage 29, and the timing generator 30 co-operate for supplying timing signals for the driving device 3, for the read generator 4, and for the read device 5.

In greater detail, the oscillator 27 generates a master clock signal $CK_M$ and an auxiliary clock signal $CK_{AUX}$, in a way asynchronous with respect to the oscillations of the microelectromechanical loop 18 and, in particular, of the driving mass 7. The oscillator 27 is calibrated in the factory so that a master frequency $\omega_M$ of the master clock signal $CK_M$ is equal to an integer multiple N, preferably a power of 2, of the driving frequency $\omega_D$ of the microelectromechanical loop 18 ($\omega_M = N\omega_D$, with N greater than $2^9$, for example equal to $2^{10}$). For this purpose, a frequency-calibration register 31 is associated to the oscillator 27 and enables modification from outside of the frequency of the master clock signal $CK_M$. The auxiliary clock signal $CK_{AUX}$, generated by frequency division from the master clock signal $CK_M$, has an auxiliary frequency $\omega_{AUX}$ equal to $\omega_M/N$, i.e., substantially equal to the driving frequency $\omega_D$.

The temperature-compensation module 28 comprises a temperature sensor 28a and a memory 28b. The temperature sensor 28a is integrated in the same semiconductor chip as the oscillator 27 and is thermally coupled thereto. The memory 28b, the contents of which are defined during calibration in the factory, comprises an empirical table of correction values of the frequency as a function of the temperature. In use, the memory 28b returns a correction value Δ (in response to a temperature value T supplied by the temperature sensor 28a. The correction value extracted is sent to the oscillator 27 and used for compensating the frequency drifts caused by temperature variations, regarding both the mechanical part (microstructure 2) and the electronics (oscillator 27).

The synchronization stage 29 receives the native clock signal $CK_N$ from the comparator 25 and the auxiliary clock signal $CK_{AUX}$ from the oscillator 27 and is configured to generate a base clock signal $CK_B$ according to a first operating mode at steady-state and to a second operating mode in stabilization transients. The stabilization transients occur at start-up (turning-on or exit from a low-consumption, or power-down, configuration), or else when the oscillations of the driving mass 7 are disturbed as a result of external shocks.

As explained in detail hereinafter, in steady-state conditions the base clock signal $CK_B$ is equal to the native clock signal $CK_N$, translated in phase by an amount such as to compensate the phase shift (in advance or in delay) introduced by the components of the electromechanical loop 18 arranged between the driving mass 7 and the variable-gain amplifier 23 (i.e., the charge amplifier 20, the band-pass filter 21, and the low-pass filter 22, in the embodiment described). Hence, in steady-state conditions, the base clock signal $CK_B$ has the driving frequency $\omega_D$ and is in phase with the oscillations of the driving mass 7.

In the stabilization transients, instead, the base clock signal $CK_B$ has the same frequency as the auxiliary clock signal $CK_{AUX}$. In one embodiment, the base clock signal $CK_B$ is also phase-shifted by the amount used for the compensation in steady-state conditions. In effect, in the stabilization transients, the phase is substantially of no effect, and the phase re-alignment may not be carried out. In this case, the base clock signal $CK_B$ is synchronous in frequency and phase with the auxiliary clock signal $CK_{AUX}$.

The synchronization stage 29 switches from the second operating mode (transient operation) to the first operating mode (steady-state operation) when the frequency of the native clock signal $CK_N$ (i.e., the current frequency of oscillation of the microelectromechanical loop 18) is close to the driving frequency $\omega_D$. In order to verify the switching condition, the synchronization stage 29 compares the frequency of the native clock signal $CK_N$ with the frequency of the auxiliary clock signal $CK_{AUX}$, which is calibrated at the driving frequency $\omega_D$. When the difference is lower than a threshold, the synchronization stage 29 passes from the second operating mode to the first operating mode. Instead, if the difference increases above the threshold, the synchronization stage 29 returns to the second operating mode.

The timing generator 30 receives the master clock signal $CK_M$ from the oscillator 27 and the base clock signal $CK_B$ from the synchronization stage 29 and uses them for generating the timing signals necessary for the discrete-time components and, more in general, for proper operation of the gyroscope 1.

In particular, the timing generator 30 supplies a first timing signal $\Phi_1$, a second timing signal $\Phi_2$, and a third timing signal $\Phi_3$, which have sensing frequency equal to an integer multiple of the frequency of the base clock signal $CK_B$ (which, in steady-state conditions, coincides with the driving frequency $\omega_D$; for example, in one embodiment, the integer multiple is 40).

The read generator 4 is timed by the third timing signal $\Phi_3$ and supplies to the driving mass 7 and to the sensing mass 8 a square-wave read signal $V_R$ with rising and falling edges, respectively, at the start and at the end of the sensing step of each cycle (in practice coinciding with the edges of the third timing signal $\Phi_3$). In one embodiment, the read signal $V_R$ is a voltage that varies between 0 V and $2V_{CM}$, where $V_{CM}$ is a common-mode voltage for the components of the microelectromechanical loop 18.

Figure 4:
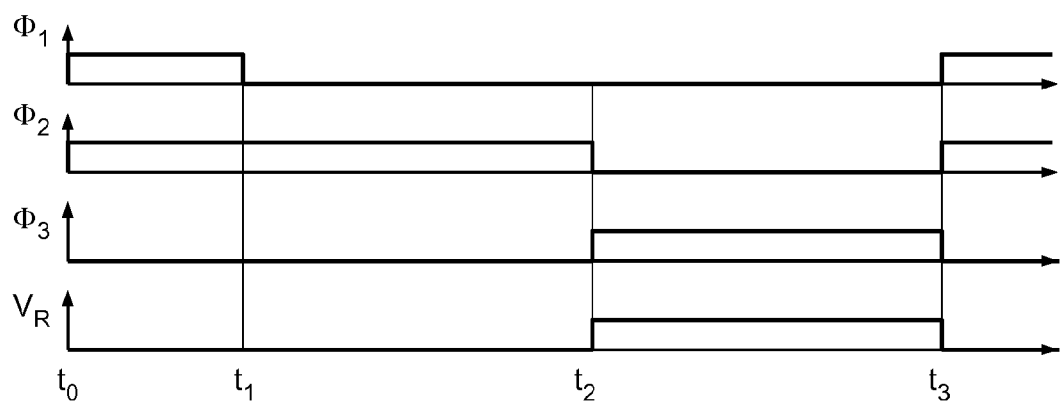
FIG. 4 is a graph regarding signals used in the gyroscope of FIG. 1.

The temporal correlation between the read signal $V_R$ and the timing signals $\Phi_1$, $\Phi_2$, $\Phi_3$ is illustrated in FIG. 4 and is defined to implement sensing and control cycles according to the correlated-double-sampling (CDS) technique. The first and second timing signals $\Phi_1$, $\Phi_2$ are high in a first fraction ($t_0$-$t_1$) of each cycle (approximately one fifth of the period, reset step), whereas the third timing signal $\Phi_3$ is low. Then (instant $t_1$), the first timing signal $\Phi_1$ switches and the situation remains unvaried for a second fraction ($t_1$-$t_2$) of the period (approximately two fifths, offset-sampling step; by "offset" is meant, here and in what follows, both the static offset and the contributions of flicker noise associated to the various components). At an instant $t_2$, the second timing signal $\Phi_2$ switches and remains stable during the third and last fraction ($t_2$-$t_3$) of the period (once again two fifths, sensing step).

The read device 5 is of the discrete-time open-loop type and, in the embodiment described herein, is configured to execute a so-called "double-ended" reading of the displacements of the sensing mass 8 according to the respective degree of freedom (in particular, for detecting a position y of the sensing mass along the sensing axis Y). In particular, the read device 5 has inputs connected to the signal-sensing terminals 17a, 17b of the microstructure 2 and an output 5a, which supplies an output signal $S_{OUT}$, representative of the angular velocity (of the microstructure 2.

Figure 5:
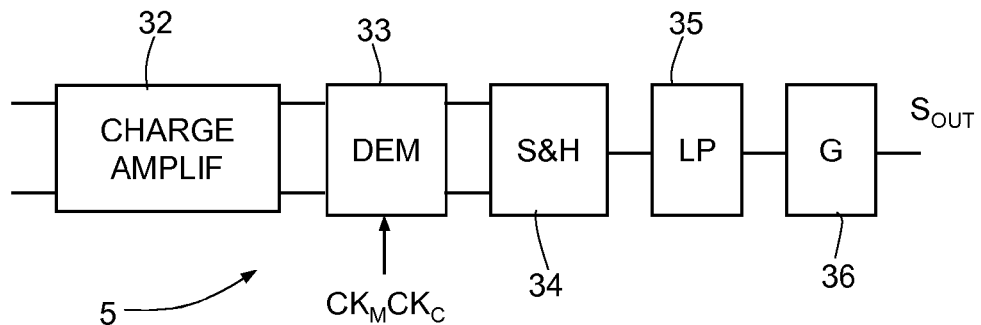
FIG. 5 is a more detailed block diagram of a first component of the gyroscope of FIG. 1.

As shown in FIG. 5, in one embodiment the read device 5 comprises a charge amplifier 32, a demodulator 33, which receives the master clock signal $CK_M$ and the base clock signal $CK_B$, a sample-and-hold (S&H) stage 34, a low-pass filter 35, and an output amplifier 36, which are cascaded to one another. The charge amplifier 32 and the demodulator 33 are of the switched-capacitor fully differential type.

The gyroscope 1 operates as hereinafter described. In steady-state conditions, the driving mass 7 is kept in oscillation along the driving axis X by the driving device 3 at the driving frequency $\omega_D$ and with controlled amplitude. The sensing mass 8 is driven in motion along the driving axis X by the driving mass 7. Consequently, when the microstructure 2 rotates about a gyroscopic axis perpendicular to the plane of the axes X, Y at a certain instantaneous angular velocity Ω, the sensing mass 8 is subject to a Coriolis force, which is parallel to the sensing axis Y and is proportional to the angular velocity (of the microstructure 2 and to the velocity of the two masses 7, 8 along the driving axis X. More precisely, the Coriolis force ($F_C$) is given by the following equation:

$$F_C = 2M_S \Omega x'$$

where $M_S$ is the value of the sensing mass 8, (is the angular velocity of the microstructure 2, and x' is the velocity of the two masses 7, 8 along the driving axis X. In steady-state conditions, the velocity x' varies in a sinusoidal way at the driving frequency $\omega_D$, with a phase shift of 90° with respect to the position x according to the driving axis X and with amplitude substantially constant as the temperature varies (the variations are ordinarily less than 1%). The displacements of the sensing mass 8 caused by the Coriolis force are read by applying the read signal $V_R$ to the sensing mass 8 itself and converting differential charge packets thus produced into the output signal $S_{OUT}$, by means of the read device 5.

The controller 24, the comparator 25, and the phase-shifter module 26 co-operate with the band-pass filter 21, the low-pass filter 22, and the variable-gain amplifier 23 for creating and maintaining the conditions of oscillation of the microelectromechanical loop 18 in different operating steps of the gyroscope 1.

In particular, in the stabilization transients the oscillations of the driving mass 7 and, consequently, the signals present in the microelectromechanical loop 18 do not have a sufficient amplitude to enable proper detection of the zero crossing of the difference voltage $\Delta V$. The comparator 25 switches in an incoherent way with respect to the oscillations of the driving mass 7, because the noise contribution prevails over the useful signal. Consequently, the synchronization stage 29 operates in the second operating mode, and the base clock signal $CK_B$ has the same frequency as the auxiliary clock signal $CK_{AUX}$ ($\omega_M/N$). The second operating mode of the synchronization stage 29 guarantees co-ordinated timing of the steps of reading of the position of the driving mass 7 and of the sensing mass 8 even when the oscillations of the microelectromechanical loop 18 are not sufficiently large to enable the comparator 25 to detect the frequency correctly.

When the amplitude of the oscillations of the driving mass 7 approaches the steady-state conditions, the amplitude of the difference voltage $\Delta V$ increases and the weight of the noise contribution is reduced accordingly. The recognition of the zero crossing of the difference voltage $\Delta V$ tends to become progressively more precise, until the synchronization stage 29 detects that the frequency of the native clock signal $CK_N$ supplied by the comparator 25 is close to the frequency of the auxiliary clock signal $CK_{AUX}$ and hence to the driving frequency $\omega_D$. The synchronization stage 29 switches to the first operating mode, and thus the base clock signal $CK_B$ is synchronous in frequency and phase with the oscillations of the driving mass 7.

The synchronism is hence maintained until a power-off command or an energy-save (power-down or sleep-mode) command or else an external event (shock) intervenes.

The solution described enables proper actuation of the gyroscope 1, in particular as regards timing of the discrete-time components, and reading of the displacements of the driving mass 7 and of the sensing mass 8. The synchronization is achieved without the use of phase-locked-loop (PLL) circuits, with considerable saving in terms of area occupation, consumption, and additional components external to the chip.

Figure 6:
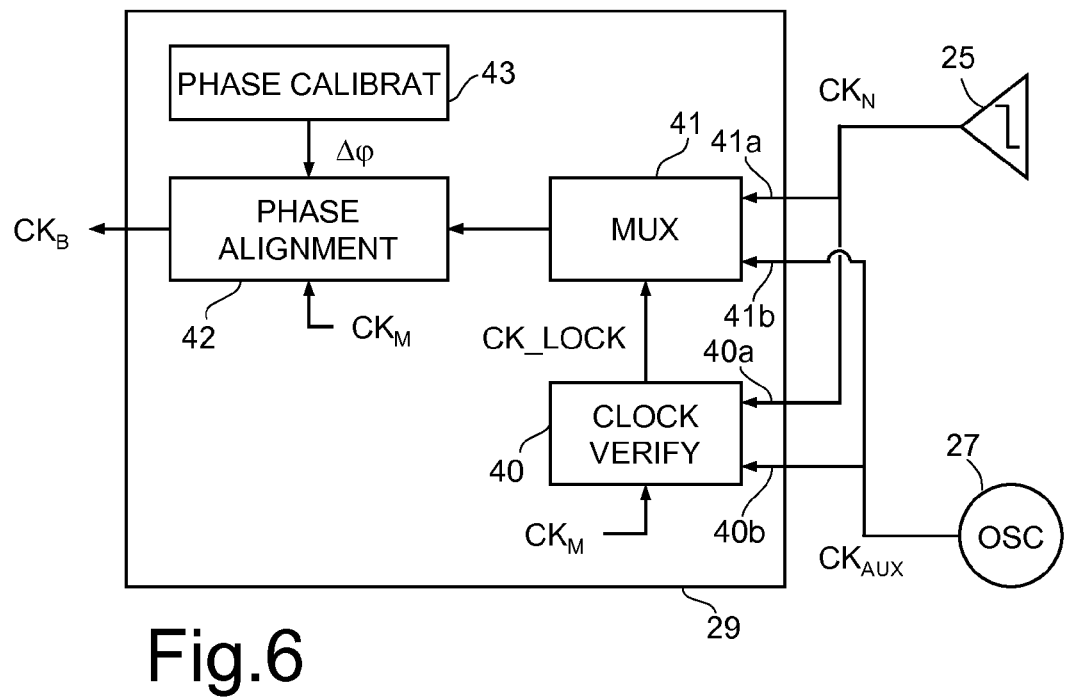
FIG. 6 is a more detailed block diagram of a second component of the gyroscope of FIG. 1.

According to one embodiment, illustrated in FIG. 6, the synchronization stage 29 comprises a clock-verify module 40, a multiplexer 41, and a phase-alignment module 42, associated to which is a phase-calibration register 43.

The clock-verify module 40 is connected to the comparator 25 and to the oscillator 27 for receiving the native clock signal $CK_N$ and the auxiliary clock signal $CK_{AUX}$ on respective comparison inputs 40a, 40b, and the master clock signal $CK_M$ on a clock input. In addition, the clock-verify module 40 is structured to verify the permanence of the current frequency of the native clock signal $CK_N$ in an admissibility range around the driving frequency $\omega_D$. The clock-verify module 40 supplies a clock lock signal CK_LOCK that has a lock (logic) value, when the current frequency of the native clock signal $CK_N$ falls within the admissibility range and an asynchronous-frequency (logic) value in the opposite case.

The multiplexer 41 has signal inputs 41a, 41b respectively connected to the comparator 25 and to the oscillator 27 for receiving the native clock signal $CK_N$ and the auxiliary clock signal $CK_{AUX}$, and a control input 41c, connected to the output of the clock-verify module 40 for receiving the clock lock signal CK_LOCK. The multiplexer 41 moreover has an output connected to the phase-alignment module 42 and transfers at output the native clock signal $CK_N$ when the clock lock signal CK_LOCK has the lock value, and the auxiliary clock signal $CK_{AUX}$ when the clock lock signal CK_LOCK has the asynchronous-frequency value.

The phase-alignment module 42, which receives also the master clock signal $CK_M$ from the oscillator 27, applies a calibrated phase shift $\Delta$ (to the clock signal received from the multiplexer 41 The calibrated phase shift is stored in the phase-calibration register 43 during calibration in the factory and is substantially equal, in absolute value, to the phase shift introduced by the components of the microelectromechanical loop arranged between the driving mass 7 and the variable-gain amplifier 23 (i.e., the charge amplifier 20, the band-pass filter 21, and the low-pass filter 22, in the embodiment described).

Said phase shift is hence eliminated, and the base clock signal $CK_B$ is in phase with the oscillations of the driving mass 7 according to the driving axis X.

The output of the phase-alignment module 42 is connected to the timing generator 30 for supplying the base clock signal $CK_B$.

Figure 7:
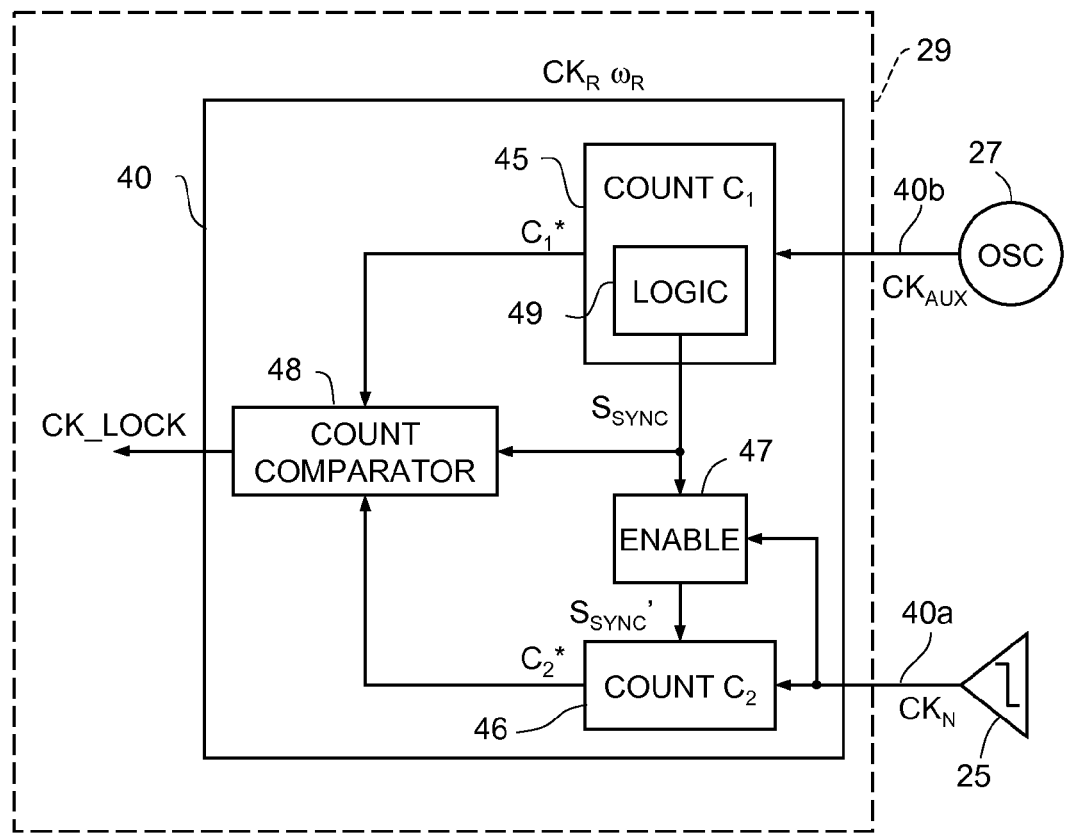
FIG. 7 is a more detailed block diagram of a part of the second component of FIG. 6.

FIG. 7 shows in greater detail the clock-verify module 40, which comprises a first clock counter 45, a second clock counter 46, an enabling element 47 and a count comparator 48.

The first clock counter 45 has a count input (defined by the second input 40b) coupled to the oscillator 27 for receiving the auxiliary clock signal $CK_{AUX}$ and stores a first count value $C_1$.

In addition, the first clock counter 45 is provided with a synchronization logic network 49, which generates a synchronization signal $S_{SYNC}$. The synchronization signal $S_{SYNC}$ is supplied to the enabling element 47 and to the count comparator 48 and has an enabling value when the first count value $C_1$ stored in the first clock counter 45 is lower than a control value $C_1^*$. When the control value $C_1^*$ is reached, the synchronization signal $S_{SYNC}$ switches to a disabling value and, moreover, the first clock counter 45 is reset.

The second clock counter 46 has a count input (defined by the first input 40a) coupled to the comparator 25, for receiving the native clock signal $CK_N$, and an enabling input connected to the enabling element 47. The second clock counter 46 stores a second count value $C_2$, which is incremented at each cycle of the native clock signal $CK_N$ when the second clock counter 46 is enabled.

The enabling element 47 is, for example, a flip-flop of a DT type and receives the synchronization signal $S_{SYNC}$ on a data input from the first clock counter 45 and the native clock signal $CK_N$ on a clock input from the comparator 125. In this way, the enabling element 47 transfers the value of the synchronization signal $S_{SYNC}$ to the enabling input of the second clock counter 46, which is thus incremented at each cycle of the native clock signal $CK_N$, as long as the synchronization signal $S_{SYNC}$ remains at the enabling value (i.e., until the first clock counter 45 reaches the control value $C_1^*$). The native clock signal $CK_N$ on the clock input of the enabling element 47 prevents spurious switchings and errors of the second clock counter 46.

The count comparator 48 is coupled to the first clock counter 45, from which it receives also the synchronization signal $S_{SYNC}$, and to the second clock counter 46.

The count comparator 48 supplies at output the clock lock signal CK_LOCK and determines the value thereof as described hereinafter.

Figure 8:
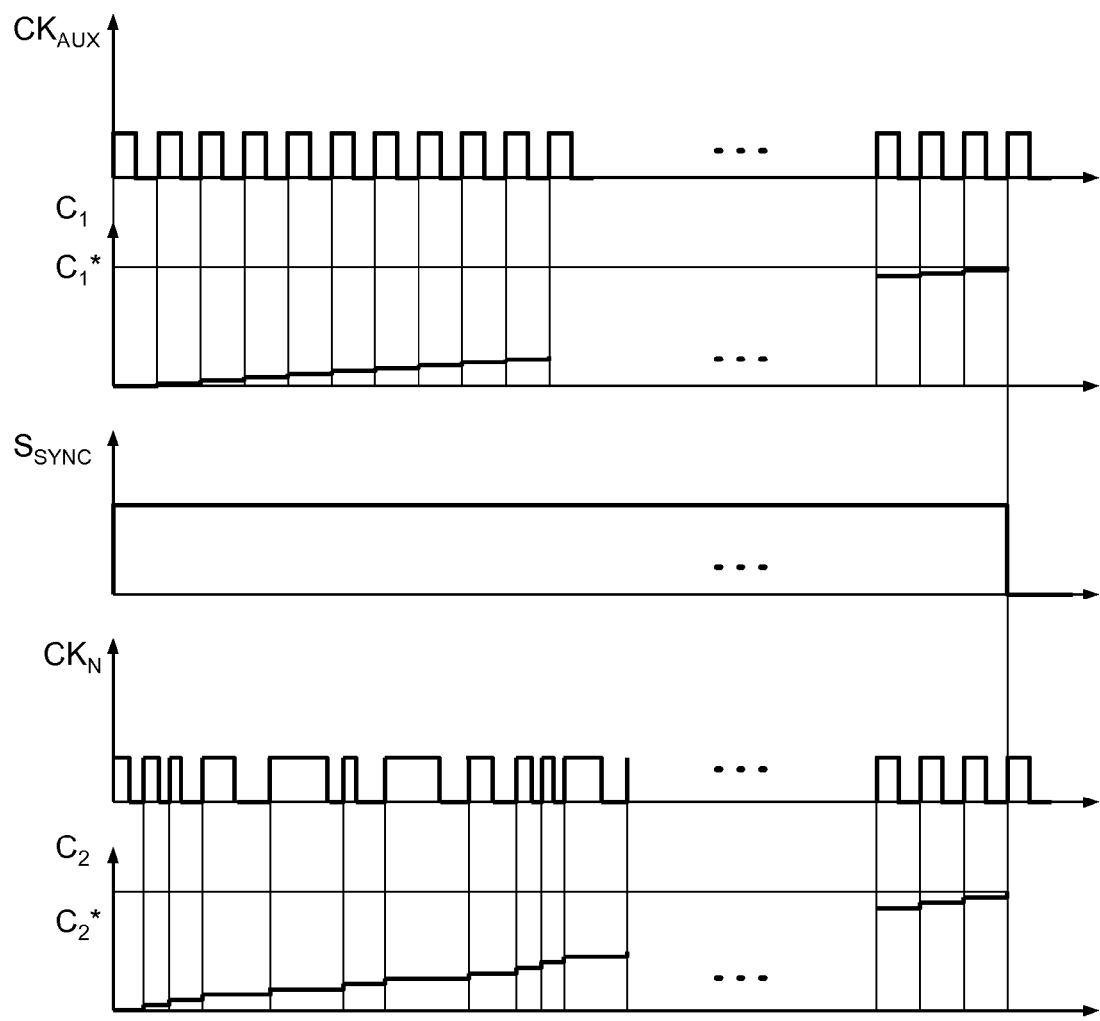
FIG. 8 is a graph regarding signals used in the gyroscope of FIG. 1.

When the first clock counter 45 starts a count after having been reset, the synchronization signal $S_{SYNC}$ switches to the enabling value (as shown in FIG. 8, which regards a start-up step in which the driving mass is forced into oscillation starting from a resting condition). The second clock counter 46 is enabled and is incremented at each cycle of the native clock signal $CK_N$, independently of the first clock counter 45. In addition, the current frequency of the native clock signal $CK_N$ progressively approaches the frequency of the auxiliary clock signal $CK_{AUX}$, as a result of the increase in amplitude of the oscillations due to forcing. The frequency variations of the native clock signal $CK_N$ are illustrated in an exaggerated way in FIG. 8.

When the first clock counter 45 reaches the control value $C_1^*$, the synchronization signal $S_{SYNC}$ switches to the disabling value, and the final count value $C_2^*$ stored in the second clock counter 46 is frozen.

In addition, the count comparator 48 takes the control value $C_1^*$ and the final count value $C_2^*$, respectively, from the first clock counter 45 and from the second clock counter 46 and assigns a value to the clock lock signal CK_LOCK according to whether the lock condition:

$$\left| \frac{C_1^* - C_2^*}{C_1^*} \right| \leq X$$

is verified or not.

More precisely, if the control value $C_1^*$ and the final count value $C_2^*$ satisfy the lock condition, assigned to the clock lock signal CK_LOCK is the lock value. In this case, in fact, the current frequency of the native clock signal $CK_N$ is close to the frequency of the auxiliary clock signal $CK_{AUX}$ and hence to the driving frequency $\omega_D$.

In the opposite case, i.e., if the inequality is not verified, the count comparator 48 assigns to the clock lock signal CK_LOCK the asynchronous-frequency value.

Figure 9:
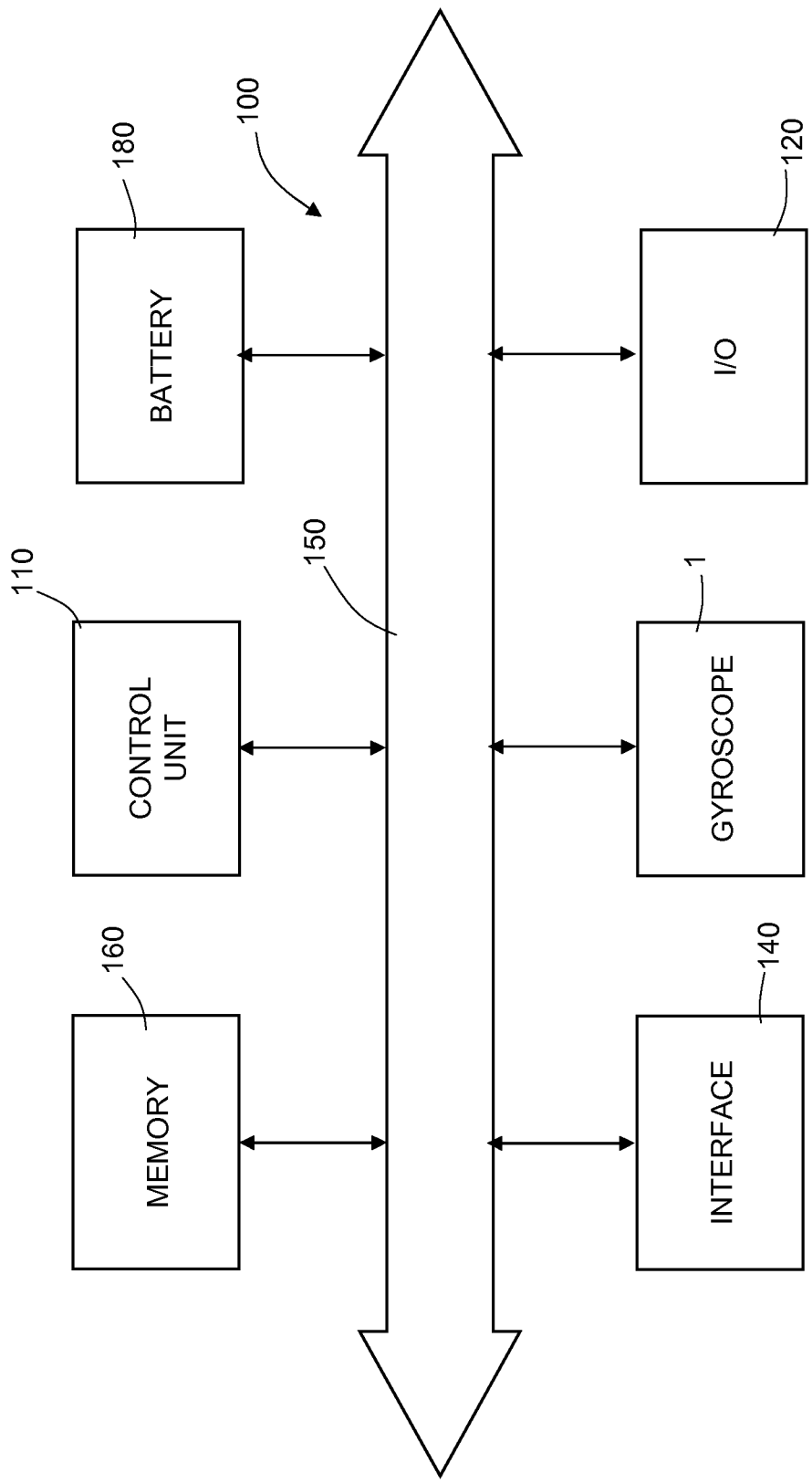
FIG. 9 is a simplified block diagram of an electronic system incorporating a microelectromechanical gyroscope according to one embodiment of the present disclosure.

FIG. 9 illustrates a portion of an electronic system 100 according to one embodiment of the present disclosure. The system 100 incorporates the gyroscope 1 and may be used in devices, such as, for example, a palmtop computer (personal digital assistant, PDA), a laptop or portable computer, possibly with wireless capacity, a cell phone, a messaging device, a digital music reader, a digital camera, or other devices designed to process, store, transmit or receive information. For example, the gyroscope 1 may be used in a digital camera for detecting movements and carrying out an image stabilization. In other embodiments, the gyroscope 1 is included in a portable computer, a PDA, or a cell phone for detecting a free-fall condition and activating a safety configuration. In a further embodiment, the gyroscope 1 is included in a user interface activated by movement for computers or consoles for videogames. In a further embodiment, the gyroscope 1 is incorporated in a satellite-navigation device and is used for temporary tracking of position in the case of loss of the satellite-positioning signal.

The electronic system 100 may comprise a controller 110, an input/output (I/O) device 120 (for example, a keyboard or a screen), the gyroscope 1, a wireless interface 140, and a memory 160, of a volatile or nonvolatile type, coupled to one another through a bus 150. In one embodiment, a battery 180 may be used for supplying the system 100. It is to be noted that the scope of the present disclosure is not limited to embodiments having necessarily one or all of the devices listed.

The controller 110 may comprise, for example, one or more microprocessors, microcontrollers, and the like.

The I/O device 120 may be used for generating a message. The system 100 may use the wireless interface 140 for transmitting and receiving messages to and from a wireless-communications network with a radiofrequency (RF) signal. Examples of wireless interface may comprise an antenna, a wireless transceiver, such as a dipole antenna, even though the scope of the present disclosure is not limited from this standpoint. In addition, the I/O device 120 may supply a voltage representing what is stored either in the form digital output (if digital information has been stored) or in the form analog output (if analog information has been stored).

Finally, it is clear that modifications and variations may be made to the gyroscope and to the method described, without thereby departing from the scope of the present disclosure.

In particular, the gyroscope could have any different micromechanical structure. For example, the disclosure can be advantageously exploited in: gyroscopes with one or more sensing masses linearly movable with respect to the driving mass and sensitive to rotations of pitch and/or roll (in addition to rotations of yaw); gyroscopes with cantilever sensing masses or sensing masses in the form of beams oscillating about centroidal or non-centroidal axes; and uniaxial and multiaxial gyroscopes with angularly oscillating driving mass.

The various embodiments described above can be combined to provide further embodiments. All of the U.S. patents, U.S. patent application publications, U.S. patent application, foreign patents, foreign patent application and non-patent publications referred to in this specification are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope comprising:
a body;
a driving mass movable with respect to the body with a first degree of freedom according to a driving axis;
a sensing mass mechanically coupled to the driving mass so as to be drawn in motion according to the driving axis and movable with respect to the driving mass with a second degree of freedom according to a sensing axis, in response to rotations of the body;
a driving device, forming a microelectromechanical control loop with the body and the driving mass and configured to maintain the driving mass in oscillation according to the driving axis with a driving frequency, the driving device including:
a frequency detector coupled to a control node of the microelectromechanical control loop and configured to provide a first clock signal with a frequency equal to a current oscillation frequency of the driving mass; and
a synchronization stage coupled to the frequency detector and configured to apply, in a first operation mode, a calibrated phase shift to the first clock signal to compensate for a phase shift arising between the driving mass and the control node, wherein the synchronization stage is configured to provide a second clock signal that, in the first operation mode, has the same frequency as the first clock signal and a phase shift equal to the calibrated phase shift; and an oscillator configured to provide to the synchronization stage a third clock signal having an auxiliary frequency close to the driving frequency.

2. A gyroscope according to claim 1, comprising a timing generator coupled to the synchronization stage and configured to provide a plurality of timing signals based on the second clock signal.

3. A gyroscope according to claim 2, wherein the timing signals have frequency equal to an integer multiple of the frequency of the second clock signal.

4. A gyroscope according to claim 2, wherein the microelectromechanical control loop comprises a switched-capacitor component configured to be operated through the timing signals.

5. A gyroscope according to claim 2, comprising a reading generator coupled to the driving mass and to the sensing mass and configured to provide a square-wave reading signal to the driving and sensing masses.

6. A gyroscope according to claim 5, wherein the reading generator is coupled to the timing generator and is configured to provide the square-wave reading signal based on at least one of the timing signals.

7. A gyroscope according to claim 1, wherein the synchronization stage is configured, in a second operation mode, to provide the second clock signal with a frequency equal to the auxiliary frequency of the third clock signal.

8. A gyroscope according to claim 7, wherein the synchronization stage is configured to compare the frequency of the first clock signal with the auxiliary frequency of the third clock signal, switch from the second operation mode to the first operation mode when a difference between the frequency of the first clock signal and the auxiliary frequency of the third clock signal falls below a threshold, and switch from the first operation mode to the second operation mode when the difference between the frequency of the first clock signal and the auxiliary frequency of the third clock signal exceeds the threshold.

9. A gyroscope according to claim 7, wherein the synchronization stage comprises:

a clock verify module coupled to the frequency detector and to the oscillator and configured to receive the first clock signal and the third clock signal, and provide a clock lock signal having a first logic value, when the frequency of the first clock signal is within an acceptability range around the driving frequency, and a second logic value, when the frequency of the first clock signal is out of the acceptability range;

a selector coupled to the frequency detector and to the oscillator and configured to receive the first clock signal and the third clock signal, and configured, under control by the clock verify module, to output the first clock signal when the clock lock signal has the first logic value, and output the third clock signal when the clock lock signal has the second logic value; and a phase alignment module coupled to the selector and configured to apply the calibrated phase shift to the first clock signal when the clock lock signal has the first logic value.

10. A gyroscope according to claim 1, comprising a temperature compensation module coupled to the oscillator and configured to cause the oscillator to compensate for frequency drifts caused by temperature variations.

11. A gyroscope according to claim 10, wherein the temperature compensation module comprises a temperature sensor thermally coupled to the oscillator, and a memory configured to store a plurality of correction values and provide to the oscillator respective correction values in response to temperature values provided by the temperature sensor.

12. A gyroscope according to claim 10, wherein the driving device includes:

an amplifier coupled to the driving mass and configured to produce a detection signal based on detected motion of the driving mass; and a filter configured to filter the detection signal and produce the phase shift which the synchronization stage is configured to compensate for.

13. A system, comprising:

a control unit; and a microelectromechanical gyroscope coupled to the control unit and including:

a body;

a driving mass movable with respect to the body with a first degree of freedom according to a driving axis;

a sensing mass mechanically coupled to the driving mass so as to be drawn in motion according to the driving axis and movable with respect to the driving mass with a second degree of freedom according to a sensing axis, in response to rotations of the body;

a driving device, forming a microelectromechanical control loop with the body and the driving mass and configured to maintain the driving mass in oscillation according to the driving axis with a driving frequency, the driving device including:

a frequency detector coupled to a control node of the microelectromechanical control loop and configured to provide a first clock signal with a frequency substantially equal to a current oscillation frequency of the driving mass;

a synchronization stage coupled to the frequency detector and configured to apply, in a first operation mode, a calibrated phase shift to the first clock signal to compensate for a phase shift arising between the driving mass and the control node, wherein:

the synchronization stage is configured to provide a second clock signal that, in the first operation mode, has the same frequency as the first clock signal and a phase shift equal to the calibrated phase shift;

the driving device includes a timing generator coupled to the synchronization stage and configured to provide a plurality of timing signals based on the second clock signal; and the driving device includes an oscillator configured to provide to the synchronization stage a third clock signal having an auxiliary frequency close to the driving frequency.

14. A system according to claim 13, wherein:

the synchronization stage is configured, in a second operation mode, to provide the second clock signal with a frequency equal to the auxiliary frequency of the third clock signal;

the synchronization stage is configured to compare the frequency of the first clock signal with the auxiliary frequency of the third clock signal, switch from the second operation mode to the first operation mode when a difference between the frequency of the first clock signal and the auxiliary frequency of the third clock signal falls below a threshold, and switch from the first operation mode to the second operation mode when the difference between the frequency of the first clock signal and the auxiliary frequency of the third clock signal exceeds the threshold.

15. A system according to claim 13, wherein the synchronization stage comprises:
a clock verify module coupled to the frequency detector and to the oscillator and configured to receive the first clock signal and the third clock signal, and provide a clock lock signal having a first logic value, when the frequency of the first clock signal is within an acceptability range around the driving frequency, and a second logic value, when the frequency of the first clock signal is out of the acceptability range;
a selector coupled to the frequency detector and to the oscillator and configured to receive the first clock signal and the third clock signal, and configured, under control by the clock verify module, to output the first clock signal when the clock lock signal has the first logic value, and output the third clock signal when the clock lock signal has the second logic value; and
a phase alignment module coupled to the selector and configured to apply the calibrated phase shift to the first clock signal when the clock lock signal has the first logic value.

16. A method for actuating a microelectromechanical gyroscope that includes a body, a driving mass movable with respect to the body with a first degree of freedom according to a driving axis, and a sensing mass mechanically coupled to the driving mass so as to be drawn in motion according to the driving axis and movable with respect to the driving mass with a second degree of freedom according to a sensing axis, in response to rotations of the body, the method comprising:
maintaining the driving mass in oscillation according to the driving axis with a driving frequency through a microelectromechanical control loop including the body and the driving mass;
detecting a current oscillation frequency of the driving mass at a control node of the microelectromechanical control loop;
applying, in a first operation mode, to a first clock signal a calibrated phase shift calibrated to compensate for a phase shift caused by components of the microelectromechanical control loop arranged between the driving mass and the control node;
producing a second clock signal that, in the first operation mode, has the same frequency as the first clock signal and a phase shift equal to the calibrated phase shift;
producing a third clock signal having a frequency close to the driving frequency;
comparing the frequency of the first clock signal with the frequency of the third clock signal;
providing, in a second operation mode, the second clock signal with a frequency equal to the frequency of the third clock signal;
switching from the first operation mode to the second operation mode when a difference between the frequency of the first clock signal and the frequency of the third clock signal exceeds a threshold stage; and
switching from the second operation mode to the first operation mode when the difference between the frequency of the first clock signal and the auxiliary frequency of the third clock signal falls below the threshold.

17. A method according to claim 16, further comprising:
providing a clock lock signal having a first logic value, when the frequency of the first clock signal is within an acceptability range around the driving frequency, and a second logic value, when the frequency of the first clock signal is out of the acceptability range;
outputting the first clock signal in response to the clock lock signal having the first logic value;
outputting the third clock signal in response to the clock lock signal having the second logic value; and
applying the calibrated phase shift to the first clock signal in response to the clock lock signal having the first logic value.

* * * * *